United States Patent [19]

Brodu

[11] Patent Number: 4,924,591
[45] Date of Patent: May 15, 1990

[54] TURNTABLE DEVICE FOR MEASURING ANGLES OF LOCK OF A STEERABLE WHEEL OF AN AUTOMOBILE

[75] Inventor: Jacques Brodu, Paris, France
[73] Assignee: Etablissements M. Muller & Cie., Chelles, France
[21] Appl. No.: 224,398
[22] Filed: Jul. 26, 1988
[30] Foreign Application Priority Data
   Aug. 10, 1987 [FR] France ............. 87 11353
[51] Int. Cl.$^5$ .................................. G01B 5/24
[52] U.S. Cl. ................................... 33/203.14
[58] Field of Search ........... 33/203.12, 203.14, 203.15, 33/203.16, 203.17, 203.18, 203.19, 335, 336, 286, 288, 600, 534, 1 N

[56] References Cited
U.S. PATENT DOCUMENTS
   2,125,534  8/1938  Wochner ................ 33/203
   4,574,490  3/1986  Curchod .............. 33/203.18

FOREIGN PATENT DOCUMENTS
   2466745  4/1981  France .
   2571495  4/1986  France ................... 33/1 N
   2077926  12/1981 United Kingdom .
   2106254  4/1983  United Kingdom ........... 33/288

Primary Examiner—William A. Cuchlinski, Jr.
Assistant Examiner—Alvin Wirthlin
Attorney, Agent, or Firm—Young & Thompson

[57] ABSTRACT

In a turntable device for measuring angles of lock of a steerable wheel of an automobile, the spindle of the turntable is coupled to an angular displacement pickup carried by a movable arm or the like which is subjected to the translational displacements of the turntable. The movable arm or another part which is associated with the turntable and accompanies this latter in its translational displacements is equipped with a detection element placed opposite to a stationary zone having physical characteristics (such as electrical conductivity, reflecting power, etc.) which are different from those of the zone support. The function of the zone surface is virtually to materialize the freedom of displacement conferred on the turntable by its mode of assembly. The detection element is connected into an electric circuit for controlling a visual signal element or a system for stopping the measuring apparatus associated with the angular displacement pickup of the device.

4 Claims, 3 Drawing Sheets

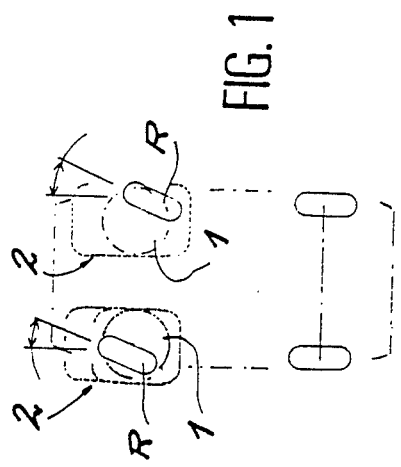
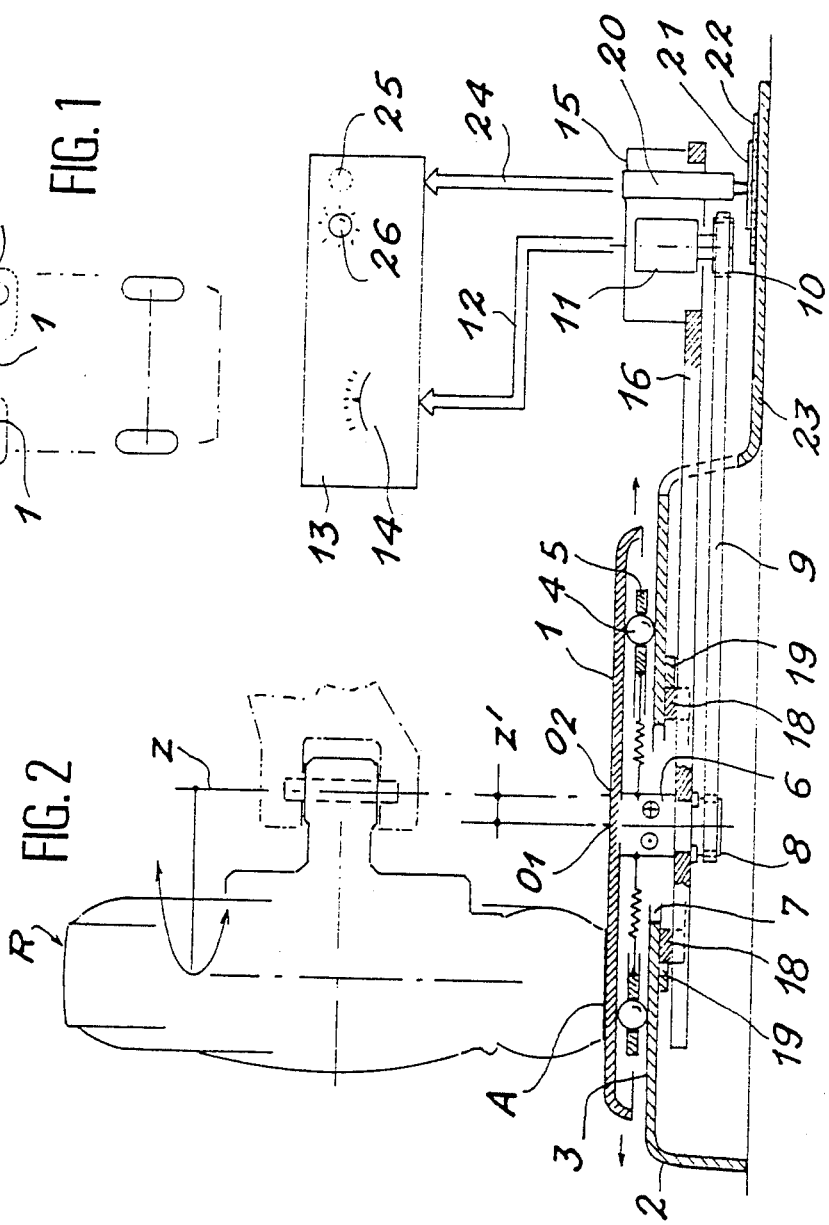

TURNTABLE DEVICE FOR MEASURING ANGLES OF LOCK OF A STEERABLE WHEEL OF AN AUTOMOBILE

BACKGROUND OF THE INVENTION

1. Field of the Invention

The present invention relates to turntable devices employed for measuring angles of lock of a steerable wheel of an automobile.

2. Description of the Prior Art

A measuring device of this type has a horizontal turntable which is intended to receive a steerable wheel and is movably mounted on a stationary support so as to be capable both of free pivotal motion and of limited displacements in its own plane, the spindle of said turntable being coupled with an angular displacement pickup for measuring the angle of lock. The pickup is carried by an arm which is associated with the displaceable turntable and accompanies this latter in its movements of translation without being subjected to its pivotal movements. In order to determine the angles of lock of the two steerable wheels of an automobile, these wheels are accordingly placed on the turntables of two devices of this type, whereupon the desired measurements are made by turning the wheels successively in one direction and in the other. It is worthy of note in this connection that the possibility of limited displacements of each turntable in its own plane is necessary, taking into account the fact that the vertical axis of pivotal motion of each wheel is not usually located vertically above the axis of pivotal motion of the corresponding turntable.

In devices of this type which are at present in use, the turntable rests on the top surface of the stationary support by means of ball-bearings and its vertical spindle is engaged through an opening of said support. The cross-sectional area of this opening therefore determines the amplitude of the possible translational displacements of the turntable in its own plane.

However, it is possible that, while a wheel is being turned, the corresponding turntable moves in such a manner that its spindle is abuttingly applied against the edge of the opening of the corresponding support. This completely upsets the measurements made. The results thus obtained are completely erroneous. Furthermore, in current devices of this type, the operator has no possibility of detecting this malfunction other than by observing the absurd character of the measurements indicated by the corresponding device.

This defect is again found in the device disclosed in French patent No. 2,466,745 which describes a mechanical turntable of the type recalled in the foregoing and having a distinctive feature consisting of a system for taking up play. In fact, no means are provided in this device for preventing an erroneous measurement in the event that the top plate comes into a position of mechanical abutment on the bottom plate.

In British patent No. 2,106,254, there is described an apparatus for measuring side-slip or in other words a device for measuring the lateral displacement of an upper plate with respect to a lower plate which is rigidly fixed to the floor, this lateral displacement being caused by the passage of a vehicle wheel which is to be checked and exhibits toe-in or toe-out. A device of this type is in widespread use. Here again, however, an error of measurement cannot be avoided with this device if the upper plate is in a position of abutment.

For the reasons which have just been given, the aim of the invention is to improve the turntable devices of the type recalled earlier by equipping them with a system for avoiding errors of measurement of wheel-lock angles.

SUMMARY OF THE INVENTION

The invention accordingly relates to a device as recalled in the foregoing and distinguished by the fact that the movable arm for carrying the angular displacement pickup or another part which is associated with the turntable and accompanies this latter in its translational displacements is equipped with a detection element placed opposite to a stationary zone having physical characteristics (such as electrical conductivity, reflecting power, etc.) which are different from those of the zone support, the intended function of the zone surface being virtually to materialize the freedom of displacement conferred on the turntable by its mode of assembly, the detection element being connected into an electric circuit for controlling a visual signal element or a system for stopping the measuring apparatus associated with the angular displacement pickup of the device.

Thus, when the spindle of the displaceable turntable comes into abutting contact with the stationary support, the operator is immediately warned or else the measuring apparatus is automatically put out of operation. This removes the disadvantage mentioned earlier, namely the completely erroneous measurement results which would otherwise be obtained. It is then only necessary for the operator to begin the operation again by placing the wheels differently on the turntables of the two devices employed.

In an advantageous embodiment of the present device, the arm which carries the angular displacement pickup is equipped with a measuring system for determining the amplitude of transverse displacement of said arm at the time of translational motion of the turntable. This measuring system thus makes it possible to compute the distance between the point of rotation of the wheel and the median plane of this latter, that is to say the value of wheel offset on the ground. Thus, the position of the median plane of the wheel on the turntable can readily be determined.

BRIEF DESCRIPTION OF THE DRAWINGS

FIG. 1 is a diagram illustrating the use of two turntable devices for measuring angles of lock of a steerable wheel of an automobile.

FIG. 2 is a vertical schematic view of the device in accordance with the invention.

DESCRIPTION OF THE PREFERRED EMBODIMENTS

Figure 3:
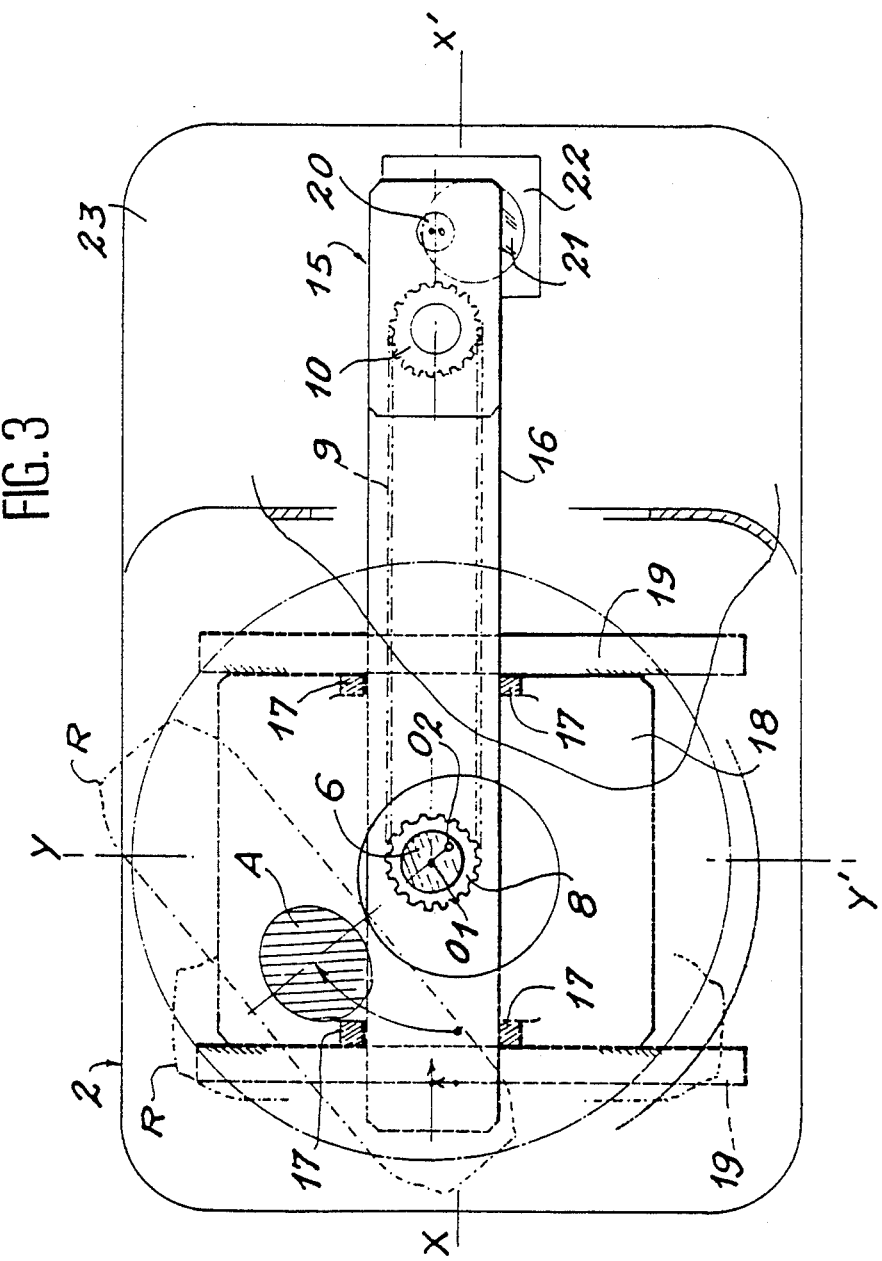
FIG. 3 is a horizontal sectional view of said device.

As best seen in FIG. 2, the device in accordance with the invention has a horizontal turntable 1 for receiving a steerable wheel R of an automobile. Said turntable is displaceably mounted on a stationary support 2 placed on the floor and having a horizontal top surface 3 which serves as a support proper for the turntable 1. Said turntable rests on said surface by means of a series of balls 4 mounted within a plate 5 which serves as a ball cage or retainer. The bottom surface of the turntable 1 is adapted to carry a vertical shaft 6 which is engaged through an opening 7 of the top surface of the support 2. The cross-sectional area of said opening therefore determines the amplitude of possible displacements of the turntable 1 in its own plane, said turntable being in any case capable of rotating freely by rotation of its spindle 6.

The free end of said spindle is adapted to carry a pinion 8 on which is engaged a slotted drive-belt 9 and which is coupled by means of this latter with a similar pinion 10 carried by the shaft of an angular displacement pickup 11. This pickup, which can consist of a potentiometer, is connected by means of a circuit 12 to a measuring apparatus, the display panel 13 of which includes a system 14 for indicating the value of the angle of rotation of the turntable 1 at the time of turning of the corresponding wheel R.

Said pickup is fixed within a casing 15 carried by the free end of a horizontal arm 16, the opposite end of which is fitted with a bearing in which the spindle 6 of the turntable 1 is rotatably mounted. The corresponding end of said arm is mounted for sliding displacement in the transverse direction X—X' of the device. To this end, said arm is placed between guides 17 (see FIG. 3) carried by a horizontal plate 18 placed beneath the top surface 3 of the stationary support 2. Said horizontal plate is in turn mounted for sliding displacement in the longitudinal direction Y—Y' of the device. To this end, the plate is placed between two fixed guide strips 19 provided on the bottom wall of the top surface 3 of the stationary support 2. Thus, any movement of horizontal translation of the turntable 1 is entirely retransmitted to the casing which carries the angular displacement pickup 11.

The result achieved by the assembly thus provided is that, at the time of turning of two steerable vehicle wheels which are placed on two devices as herein described (see FIG. 1), the displaceable turntable 1 of each device is capable both of pivotal displacement about the axis of its spindle 6 and of translational displacement in its own plane. The point of rotation $O_2$ of each wheel R corresponds to the intersection of the axis Z—Z' of its king pin and of the surface of the corresponding turntable 1. This point of rotation is variable from one vehicle to another and depends on the geometry of the corresponding vehicle. Furthermore, except in the event of a fortuitous circumstance which is wholly improbable, the position of said point of rotation $O_2$ of the wheel does not correspond to the center $O_1$ of the spindle 6 of the turntable 1 since the zone A in which the wheel bears on the displaceable turntable is variable. It is for this reason that the displaceable turntable is subjected to a translational displacement at the time of turning of the wheel, this movement being precisely made possible by the particular arrangement described earlier.

However, this freedom of translational displacement is limited by the spindle 6 as this latter comes into abutment with the internal edge of the opening 7 formed in the stationary support 2. In more precise terms, if the plate 5 which serves as a cage for the balls 4 has an annular flange (not shown), the spindle 6 comes first into abutting contact with said annular flange which is in turn abuttingly applied against the internal wall of the opening 7. The zone of free translational displacement of the turntable 1 is thus defined by the circular sector whose center is the center of the opening 7 and whose radius R is the radius of said opening, less the radius of the spindle 6 and also less the thickness of the central annular flange which may be provided on the plate 5. In point of fact, the entire translational displacement of the turntable 1 is thus transmitted to the free end of the movable arm 16.

In accordance with the essential feature of the present device, the free end aforesaid is equipped with a detection element 20 placed opposite to a stationary zone 21 having particular physical characteristics which are different from those of the zone support consisting in the example under consideration of a plate 22 carried by an extension 23 of the stationary support 2.

The surface of said zone 21 corresponds to the surface of free translational displacement of the turntable 1. In consequence, as soon as the spindle 6 of said turntable comes directly or indirectly into abutment with the stationary support 2, the detector 20 is displaced to a point outside the zone 21. But this detector, which is capable of immediately detecting this event, is connected by means of an electric circuit 24 to the measuring apparatus which is associated with the present device. This detector can then initiate turn-on of a signal lamp 25 which indicates that the device is no longer capable of operating normally whereas another signal lamp 26 is turned-on when the device operates under normal conditions. However, the circuit 24 in which is connected the detector 20 can also be designed for automatically initiating stoppage of the measuring system of the device in accordance with the invention. If so required, the safety system under consideration is capable both of initiating turn-on of a signal lamp 25 and of interrupting the operation of the measuring system.

The zone 21 placed opposite to the detector 20 can be differentiated from its support 22 by characteristics of electrical conductivity. Said zone can be constituted, for example, by a copper layer formed on a plate 22 of insulating material. In such a case, the corresponding detector 20 is an inductive detector which transmits logic information on the all-or-none principle, depending on whether it is located opposite to the conductive zone 21 or not.

However, the detection system employed can also be a magnetic detection system or else an optical detection system. If an optical system is adopted, the zone 21 can be materialized by a reflecting zone, in which case the detector 20 comprises both a light emitter and a light receiver placed opposite to said zone.

It would also be possible to design the detector 20 in the form of an electric microswitch having a control push-button placed against a hollow area which materializes the zone 21. Thus, if the microswitch were to move away from this zone, it would automatically be actuated by coming into contact with the support 22 of greater thickness. However, many other solutions could also be contemplated for the practical application of this position detection system.

In an advantageous form of construction of the device under consideration, the free end of the arm 16 is equipped with a measuring system for determining the amplitude of transverse displacement of said arm at the time of a translational displacement of the turntable. This measuring system thus makes it possible to compute the distance between the point of rotation of the wheel and the median plane of this latter, that is to say the value of offset of the wheel on the ground. Thus, the position of the median plane of the wheel on the turntable can readily be determined.

Figure 4:
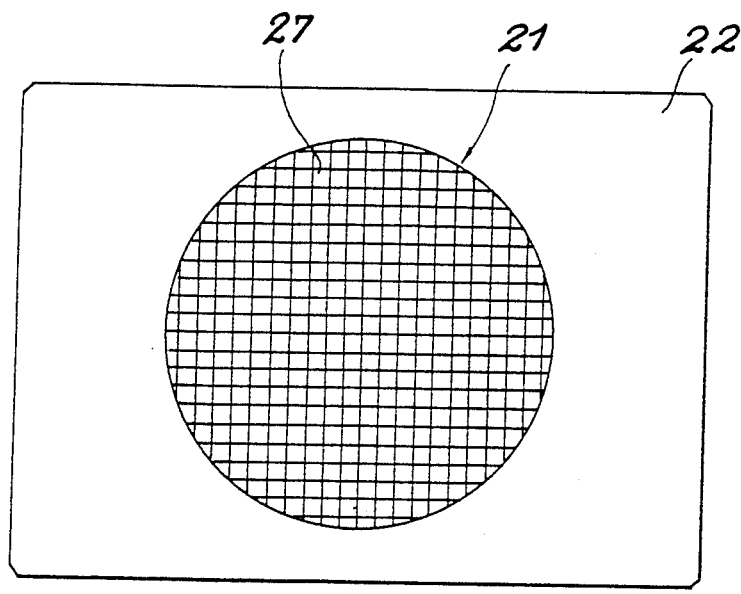
FIG. 4 is a partial plan view of an alternative embodiment.

The measuring system thus provided can consist of an optical pickup (infrared sensor, for example) mounted on the movable arm 16 and placed opposite to a squared grid or lattice 27 provided on the zone 21 (as shown in FIG. 4).

This measuring system can also consist of two small rollers mounted on the movable arm 16 and placed at right angles to each other in contact with the stationary support 2 or with a plate which is rigidly fixed to this latter. Said rollers are coupled to rotary pickups for determining the amplitude of transverse displacement of the movable arm 16.

However, any other suitable measuring system could be employed for determining the amplitude of this displacement. In any case, the device in accordance with the invention is not limited to the example of construction which has been described in the foregoing and a number of alternative embodiments of which may accordingly be contemplated. Thus, instead of being mounted on the movable arm 16 which carries the angular displacement pickup 11, the detector 20 of the position control system could be mounted on any other moving part which is associated with the turntable 1 and accompanies this latter in its translational movements without being subjected to its pivotal movements.

What is claimed is:

1. A turntable device which is intended to receive a steerable wheel of an automobile for measuring angles of lock of said wheel, comprising a horizontal turntable mounted so as to be capable of moving on a stationary support with a possibility of free pivotal motion and limited displacements in its own plane, the turntable having a spindle coupled with an angular displacement pickup carried by movable means which is subjected to translational displacements of the turntable, the translational displacements of the turntable being limited by the spindle coming into abutment with the stationary support, wherein said movable means is equipped with a detection element placed opposite to a stationary zone having physical characteristics which are different from those of a support of the stationary zone over only an area which corresponds to positions of the spindle when the spindle is out of abutment with the stationary support, the detection element being connected into an electric circuit for controlling a signal element for stopping the operation of the measuring device thereby to give a signal or to stop the measuring device when the spindle is in abutment with the stationary support.

2. A device according to claim 5, wherein said movable means comprises an arm which carries the angular displacement pickup and which is equipped with a measuring system for determining the amplitude of transverse displacement of said arm at the time of translational motion of the turntable, thus making it possible by means of said measuring system to compute the distance between the point of rotation of the wheel and the median plane of said wheel.

3. A device according to claim 2, wherein the measuring system for determining the amplitude of transverse displacement of the movable arm at the time of the translational displacement of the turntable is constituted by an optical detector placed opposite to reference marks provided on the stationary support or on a plate rigidly fixed thereto.

4. A device according to claim 2, wherein the measuring system for determining the amplitude of transverse displacement of the movable arm at the time of translational displacement of the turntable is constituted by small rollers placed at right angles to each other and coupled to rotary pickups, said rollers being placed in contact with the stationary support or with a plate which is rigidly fixed thereto.

* * * * *